(12) United States Patent
Caponetti et al.

(10) Patent No.: US 11,885,303 B2
(45) Date of Patent: Jan. 30, 2024

(54) PITCH CONTROL OF WIND TURBINE BLADES IN A STANDBY MODE (71) Applicant: VESTAS WIND SYSTEMS A/S, Aarhus N. (DK)

(72) Inventors: Fabio Caponetti, Åbyhøj (DK); Andre Brandao Martins, Lisbon (PT)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/793,602

(22) PCT Filed: Jan. 15, 2021

(86) PCT No.: PCT/DK2021/050012
§ 371 (c)(1),
(2) Date: Jul. 18, 2022

(87) PCT Pub. No.: WO2021/143991
PCT Pub. Date: Jul. 22, 2021

(65) Prior Publication Data
US 2023/0077195 A1    Mar. 9, 2023

(30) Foreign Application Priority Data
Jan. 16, 2020 (DK) .......................... PA 2020 70033

(51) Int. Cl.
F03D 7/02 (2006.01)
(52) U.S. Cl.
CPC ...... F03D 7/0224 (2013.01); F05B 2270/327 (2013.01)

(58) Field of Classification Search
CPC .... F03D 7/0224; F03D 7/0276; F03D 7/0202; F03D 17/029
See application file for complete search history.

(56) References Cited

U.S. PATENT DOCUMENTS 9,062,656 B2 * 6/2015 Brath .................... F03D 7/0276
2003/0151259 A1 8/2003 Feddersen et al.
(Continued)

FOREIGN PATENT DOCUMENTS

EP 2376774 B1 10/2015
EP 3076011 A1 10/2016
(Continued)

OTHER PUBLICATIONS

Danish Patent and Trademark Office, 1st Technical Examination including The Search Report and Search Opinion for Application PA 2020 70033 dated Jun. 22, 2020.
(Continued)

Primary Examiner — Courtney D Heinle
Assistant Examiner — John S Hunter, Jr.
(74) Attorney, Agent, or Firm — Patterson + Sheridan, LLP (57) ABSTRACT A method of operating a wind turbine generator comprising a plurality of blades, the method comprising iterating the following steps: comparing an indicated rotor speed with a rotor speed target to determine a rotor speed error; generating a modified rotor speed error by applying a control factor to the rotor speed error; controlling the pitch angle of the blades via a pitch control system in accordance with the modified speed error; and altering the control factor in dependence on a size of the indicated rotor speed.

14 Claims, 3 Drawing Sheets (56) References Cited

U.S. PATENT DOCUMENTS

2011/0305568 A1    12/2011  Brath et al.
2018/0010577 A1     1/2018  Caponetti et al.

FOREIGN PATENT DOCUMENTS

| KR | 20170052339 A | 5/2017 |
| WO | 9907996 A1 | 2/1999 |
| WO | 2017167343 A1 | 10/2017 |
| WO | 2018033190 A1 | 2/2018 |
| WO | 2021143991 A1 | 7/2021 |

OTHER PUBLICATIONS

PCT, Notification of Transmittal of The International Search Report and The Written Opinion of The International Searching Authority, or The Declaration for Application PCT/DK2021/050012 dated Apr. 20, 2021.

* cited by examiner

| | |
|---|---|
| WTG operates in the normal mode and generates power to be supplied to the external grid. | Step 1 |
| Pitch angle control module operates continuously to set the pitch angle of the blades in accordance with the normal pitch control mode. | Step 2 |
| Grid loss situation detected, and WTG switched from normal mode into standby mode. | Step 3 |
| WTG operates to generate backup power to be supplied to the battery storage system. | Step 4 |
| Indicated rotor speed compared to rotor speed target to generate rotor speed error. | Step 5 |
| Gain factor value altered in response to indicated rotor speed. | Step 6 |
| Modified speed error altered. | Step 7 |
| Pitch angle control module controls blade pitch controlled in accordance with modified speed error/rotor speed error in dependence on the value the of gain factor. | Step 8 |
| WTG reconnected to the external grid and returned to the normal mode for supplying power to the external grid after the fault has cleared. | Step 9 |

Figure 4

PITCH CONTROL OF WIND TURBINE BLADES IN A STANDBY MODE

TECHNICAL FIELD

The present disclosure relates to a method of operating a wind turbine generator (WTG), and in particular to a method of controlling the pitch angle of the blades of a WTG while the WTG is operating in a standby mode during a grid loss.

BACKGROUND

Wind power plants (WPPs), also referred to as wind farms or wind parks, typically include a number of wind turbines or wind turbine generators (WTGs) that are configured to generate power to be supplied to an external grid. During normal operating conditions the WTGs of a WPP continuously generate power to be supplied to the external grid. However, under certain operating conditions the WPP may experience a "grid loss" in which the WTGs are prevented from supplying power to the external grid, for example because the external grid is unavailable or is determined to have become unstable. In this case the WTGs may be switched into a standby mode in which the WTGs continue to run (i.e. the rotors continue to rotate) but are not operated to generate power to be supplied to the external grid.

During the grid loss, the WTGs may be disconnected from their usual power supply. In this case critical sub-systems of the WTGs including, for example, the WTGs' pitch control systems, may continue to be powered by backup power systems including a battery storage system and/or a diesel generator. However, over time these backup power systems may become depleted, in which case it may be necessary for the WTGs to be completely stopped.

In some cases the WTGs may be operated to generate backup power while operating in the standby mode, which may be used to recharge the backup power systems. However, it is still possible for the backup power systems to become depleted, for example if the power usage of critical sub-systems exceeds backup power generation over a prolonged time period.

It is an object of the present invention to address the disadvantages of known WPPs of the type described above.

SUMMARY OF THE INVENTION

According to an aspect of the present invention there is provided a method of operating a wind turbine generator, the wind turbine generator comprising a rotor having a plurality of blades. The method comprises iterating the following steps: comparing an indicated rotor speed with a rotor speed target to determine a rotor speed error; generating a modified rotor speed error by applying a control factor to the rotor speed error; controlling the pitch angle of each blade via a pitch control system in accordance with the modified speed error; and altering the control factor in dependence on a size of the indicated rotor speed.

Basing control of the pitch angle of the blades on a modified rotor speed error allows for a greater degree of flexibility, enabling tailored control of the wind turbine generator through appropriate modification of the control factor, without the need to change the pitch control system itself. For example, the control factor may modify the rotor speed error in a manner that effectively reduces the sensitivity of the pitch control system to deviations from the rotor speed target if, for example, there is a desire to reduce the power consumption of the wind turbine generator. This may be useful if the wind turbine generator is in an idling mode. Conversely, the pitch control system can also be forced to respond more sensitively than usual in certain situations.

Applying the control factor to the rotor speed error may entail multiplying the two to generate the modified speed error, which then defines an input to the pitch control system. In this case, the control factor may be considered a gain factor.

Altering the control factor in dependence on a size of the indicated rotor speed may comprise decreasing the control factor if the indicated rotor speed is in a first range of rotor speeds that includes the rotor speed target. The control factor may be decremented when the indicated rotor speed is inside the first range of rotor speeds. Equally, the control factor may be decreased by a first decrement when the indicated rotor speed is inside the first range of rotor speeds and is greater than the rotor speed target, and by a second decrement when the indicated rotor speed is inside the first range of rotor speeds and is less than the rotor speed target.

Altering the control factor in dependence on a size of the indicated rotor speed may comprise increasing the value of the control factor if the indicated rotor speed is outside the first range of rotor speeds. The control factor may be incremented when the indicated rotor speed is outside the first range of rotor speeds. In one such approach, the control factor may be increased by a first increment when the indicated rotor speed is outside the first range of rotor speeds and is greater than the rotor speed target, and by a second increment when the indicated rotor speed is outside the first range of rotor speeds and is less than the rotor speed target.

The method may comprise increasing the value of the control factor when the indicated rotor speed is outside a second range of rotor speeds that is wider than and encompasses the first range of rotor speeds. The method may also comprise leaving the control factor unchanged when the indicated rotor speed is outside of the first range of rotor speeds but within the second range of rotor speeds.

The method may comprise setting the control factor to a predetermined value when the indicated rotor speed is outside a third range of rotor speeds that is wider than and encompasses the second range of rotor speeds. The predetermined value may be greater than one.

The method may correspond to a standby pitch control mode of the wind turbine generator for use when the wind turbine generator is idling, for example during a grid loss. The standby pitch control mode may be less responsive than a normal pitch control mode of the wind turbine generator, such that the power consumption of the wind turbine generator is reduced when operating in the standby pitch control mode.

According to another aspect of the present invention, there is provided a controller configured to carry out the method described above.

A further aspect of the present invention provides a control system for a wind turbine generator comprising a rotor having a plurality of blades, the control system being configured to: compare an indicated rotor speed with a rotor speed target to determine a rotor speed error; generate a modified rotor speed error by applying a control factor to the rotor speed error; control the pitch angle of each blade in accordance with the modified speed error; and alter the control factor in dependence on a size of the indicated rotor speed.

It will be appreciated that preferred and/or optional features of each aspect of the invention may be incorporated alone or in appropriate combination in the other aspects of the invention also.

BRIEF DESCRIPTION OF THE DRAWINGS

One or more embodiments of the invention will now be described, by way of example only, with reference to the accompanying drawings, in which.

DETAILED DESCRIPTION

Figure 1:
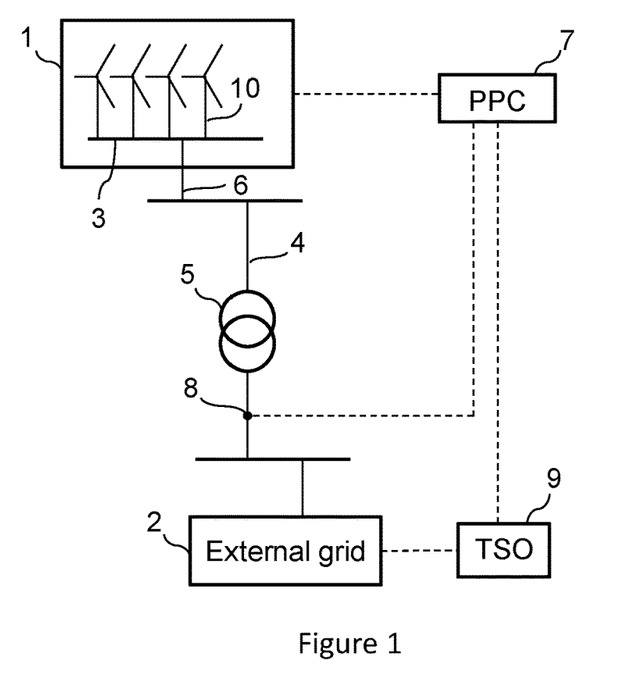
FIG. 1 is a schematic view of a wind power plant suitable for use with embodiments of the invention.

FIG. 1 schematically illustrates a portion of a transmission network including a wind power plant (WPP) 1 in accordance with one possible non-limiting embodiment of the present invention. The wind power plant may also be referred to as a wind farm or wind park. The WPP 1 comprises a plurality of wind turbines or wind turbine generators (WTGs) 10 that are configured to generate power to be supplied to an external grid 2 during normal operation of the WPP 1. As illustrated in FIG. 1, the WTGs 10 are each connected to a local grid 3 of the WPP 1. The local grid 3 is in turn connected to a point of interconnection (POI) bus 6 via which power is fed into the external grid 2 by a transmission line 4 including a main step up transformer 5. The external grid 2 may be a regional, national or international power transmission network, for example the National Grid of Great Britain.

The WPP 1 is provided with a power plant controller (PPC) 7. The PPC 7 is connected to the transmission network at a point of measurement (POM) 8 from which the PPC 7 is able to monitor the state of the transmission network, and to a grid operator or transmission system operator (TSO) 9 from which the PPC 7 is able to receive instructions concerning operation of the WPP 1. The PPC 7 is further connected to the WPP 1, and is configured to control operation of the WPP 1 in accordance with a stored set of operating instructions and instructions received from the TSO 9. In particular, the PPC 7 is configured to communicate information and instructions to controllers 20 of the respective WTGs 10, which in turn control operation of the WTGs and their various sub-systems.

It will be appreciated that the transmission network illustrated in FIG. 1 is shown schematically and in a highly simplified form for illustrative purposes only, and that the WPP 1 may include any desired number WTGs 10, which may be connected to each other and to the external grid 2 in any suitable manner.

Figure 2:
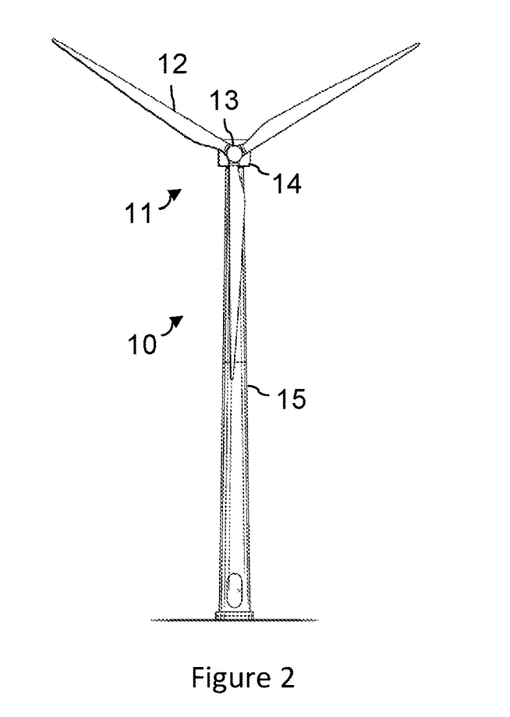
FIG. 2 is a schematic front view of a wind turbine generator of the wind power plant shown in FIG. 1.

FIG. 2 schematically illustrates a front view of a typical one of the WTGs 10 of the WPP 1. As shown in FIG. 2, the WTG 10 comprises a rotor 11 including a plurality of blades 12 extending outwardly from a hub 13. The rotor 11 is connected to a nacelle 14 which is in turn connected to a tower 15. The nacelle 14 houses a generator that is configured to be driven by the rotor 11. The WTG 10 is an on-shore horizontal axis wind turbine (HAWT) having three blades 12. However, it will be appreciated that the present invention may equally be applied to other types of WTG, including off-shore WTGs.

Figure 3:
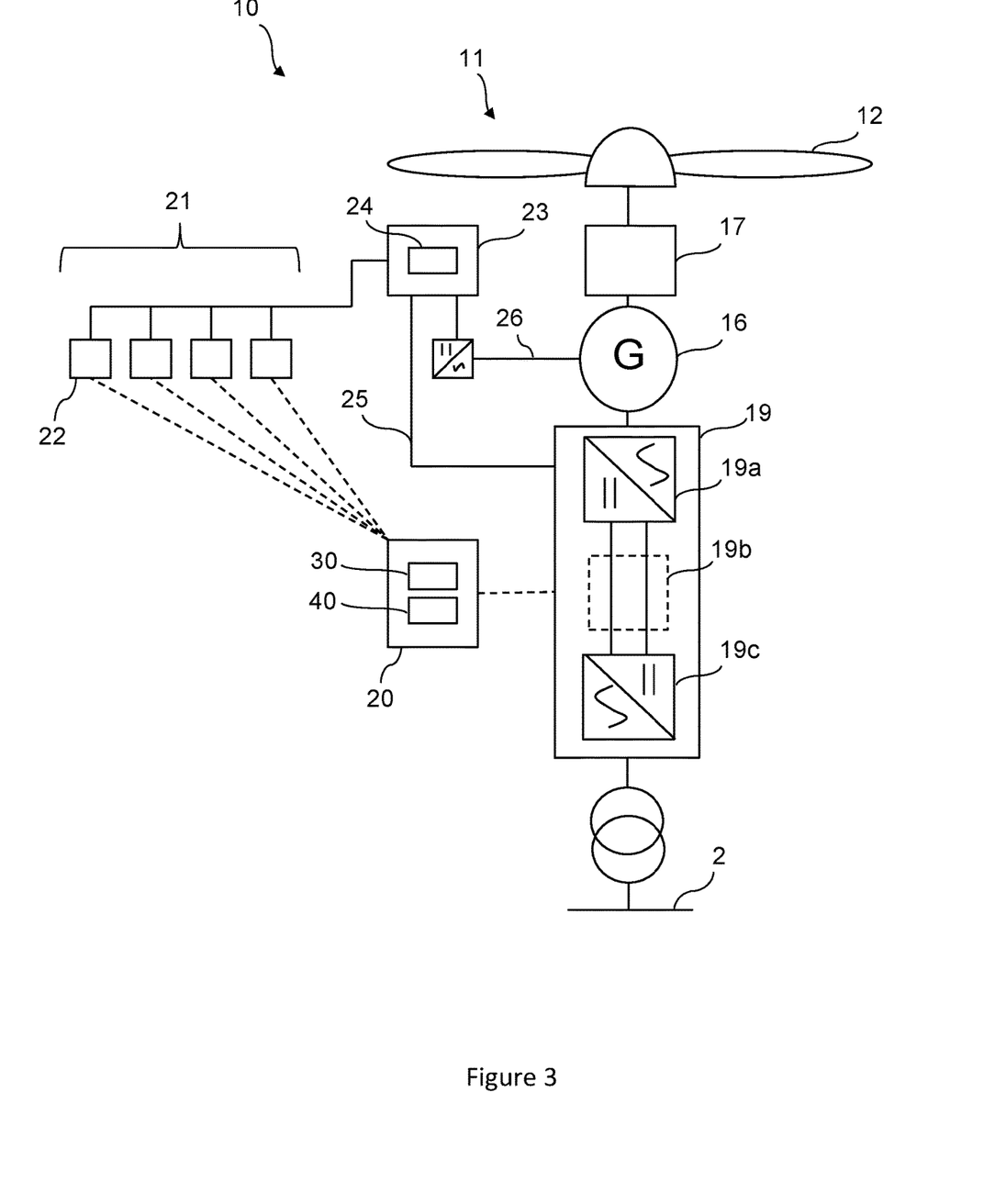
FIG. 3 is a schematic view of an architecture of the wind turbine generator shown in FIG. 2.

FIG. 3 schematically illustrates the power generation and conversion equipment and various sub-systems of the WTG 10 illustrated in FIG. 2. As shown in FIG. 3, the power generation and conversion equipment comprises a generator 16 which is driven by the rotor 11 via a transmission 17. The transmission 17 may optionally include a gearbox, or may alternatively be a direct drive transmission. The generator 16 is configured to generate power to be supplied to the external grid 2 in the usual manner.

The power generation and conversion equipment also comprises a power converter 19 that is configured to convert the output of the generator 16 to a frequency that is compatible with the external grid 2. The power converter 19 may optionally be a full scale converter comprising a machine-side AC-DC converter 19a, a DC link 19b, and a grid side DC-AC converter 19c as illustrated in FIG. 3, although converters of other types may also be used in other embodiments. The power generation and conversion equipment of the WTG 10 is generally controlled by the WTG controller 20.

As also shown in FIG. 3, the WTG 10 further comprises a power system 23 including a battery storage system (BSS) 24 which is configured to be charged by the generator 16 in any suitable manner according to the design of the WTG 10. In some cases the power system 23 may be connected to and configured to be charged by the power converter 19 (as illustrated by connection 25). In this case the power system may optionally be connected to the DC link 19b of the power converter 19, or alternatively to any other suitable portion of the power converter 19. However, in other cases the power system 23 may be configured to be charged by the generator 16 via a separate connection including a further AC-DC converter (see connection 26). The power system 23 is also connected to and configured to supply DC current to various power consuming sub-systems of the WTG 10 at least during grid loss situations, as described in more detail below.

The WTG 10 further comprises various power consuming sub-systems 21, including, for example, a pitch control actuation system 22 including one or more actuators for controlling the pitch angle of the blades 12, a yaw control actuation system comprising one or more actuators for controlling the yaw angle of the nacelle 14, a lubrication system, a lift system, a lighting system, a heating system, a cooling system, a ventilation system, a hydraulic pump system, and various sensor systems, which are also generally controlled by the WTG controller 20.

The power consuming sub-systems 21 may be powered in any suitable manner according to the design of the WTG 10 and the WPP 1 during normal operation of the WTG 10 while the WPP 1 remains connected to the external grid 2. For example, the power consuming sub-systems 21 may be powered by the local grid 3 and/or the external grid 2, optionally via a dedicated power supply grid. In this case the WTG power system 23 may be operated as a backup power system only. Alternatively, the power consuming sub-systems 21 may be powered by the WTG power system 23 during normal operation of the WTG 10. However, in either case, the WTG power system 23 is configured to supply DC current to at least some of the power consuming sub-systems 21 during a grid loss such that the WTG 10 is able to continue operating during the grid loss, even in cases in which the power consuming sub-systems 21 have been disconnected from their usual power source.

The WTG controller 20 is a control system that includes various different control modules that are configured to control operation of the WTG 10 and its various sub-systems 21. In particular, the WTG controller 20 comprises a speed control module 30 and a pitch angle control module 40 (among other modules). The speed control module 30 is configured to monitor the speed of the wind turbine 10 (i.e. rotor speed and/or generator speed) at least substantially in real time, for example using a speed sensor or alternatively by calculating or estimating the turbine speed. The pitch angle control module 40 is configured to set the pitch angle of the blades 12, for example by calculating a pitch angle set point and controlling operation of the pitch control actuation system 22 in order to achieve the desired blade pitch angle. The pitch angle set point may, for example, be calculated in dependence on the current wind turbine speed and a power demand received from the PPC 7, although other operating parameters may additionally be taken into account when setting the pitch angle set point. In controlling the pitch angle of the blades 12, the pitch angle control module 40 is therefore able to regulate the rotor speed.

It will be appreciated that the basic WTG architecture illustrated in FIG. 3 is shown schematically and in a highly simplified form for illustrative purposes only, and that the WTGs 10 may further comprise other sub-systems and control modules arranged in any suitable manner.

Figure 4:
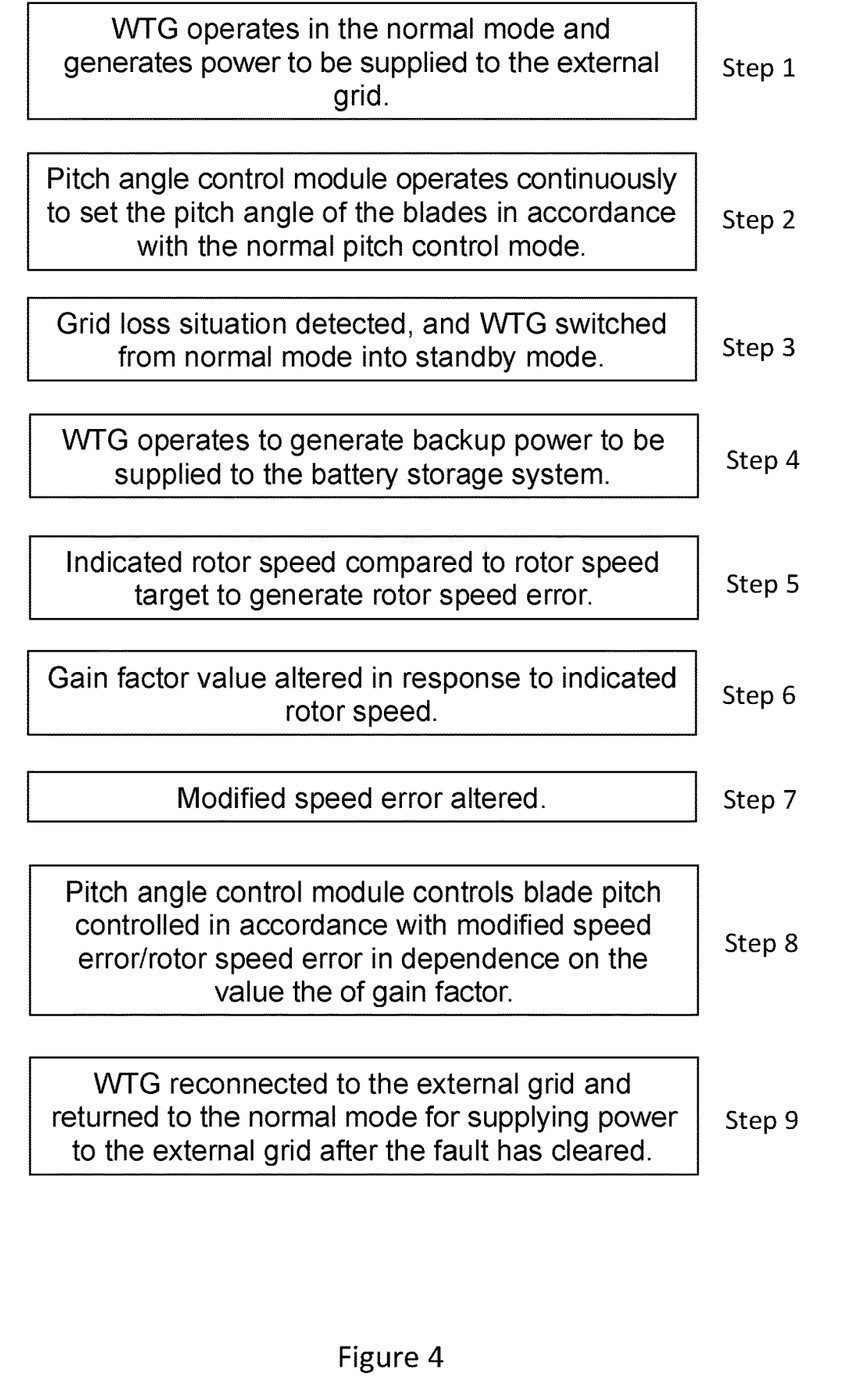
FIG. 4 is a flow chart showing a method according to an embodiment of the invention for controlling the wind turbine generator of FIG. 2 during normal operation and during a grid loss situation.

Operation of the WTGs 10 during normal operating conditions and during a grid loss will now be described with reference to the flow chart of FIG. 4. The following description refers to the control of a single WTG 10, although it will be appreciated that each of the WTGs 10 may be controlled in an equivalent manner.

Under normal operating conditions, while the WPP 1 is connected to the external grid 2 and the external grid 2 is available to receive power from the WPP 1, the WTG 10 is operated in a normal mode to generate power to be supplied to the external grid 2 via the local grid 3 and the transmission line 4, as indicated in step 1.

While the WTG 10 is being operated in the normal mode, the pitch angle control module 40 is operated continuously to calculate a pitch angle set point for the blades 12 in accordance with a normal pitch control mode, and to control operation of the pitch control actuation system 22 in order to achieve the desired blade pitch angle, as indicated in step 2.

The pitch angle control module 40 determines the desired pitch angle set point as part of a closed-loop control process based on a speed error signal, which is indicative of a difference between a rotor speed target and an indicated rotor speed. Accordingly, the pitch angle control module 40 acts to minimise the rotor speed error by determining an appropriate pitch angle set point.

The normal pitch control mode has low thresholds for performing pitch angle adjustment operations and therefore provides substantially continuous adjustment of the pitch angle of the blades 12, including in response to small and/or transient changes in operating conditions, in order to provide accurate control of the of the rotor speed and generator speed, and to optimise and/or maximise the power output of the WTG 10. In the normal pitch control mode, the speed error signal input to the pitch angle control module 40 is the rotor speed error, which represents the difference between an indicated rotor speed and a rotor speed target, and is described in more detail below.

Under certain operating conditions the WTG 10 may be disconnected from and prevented from supplying power to the external grid 2, for example if the external grid 2 is completely unavailable or is determined to have become unstable. In this case a "grid loss" situation is detected, for example by the PPC 7 and/or the WTG controller 20, and the WTG 10 is automatically switched from the normal mode into a separate standby mode in which the WTG 10 continues to run (i.e. the rotor 11 continues to rotate) but the WTG 10 is not operated to supply power to the external grid 2, as indicated in step 3. In some cases the rotor 11 may continue to rotate without interruption, although in other cases the rotor 11 may initially be stopped upon detection of the grid loss before recommencing rotation, for example by feathering the blades 12.

While the WTG is 10 operating in the standby mode during the grid loss, the power consuming sub-systems 21 may be disconnected from their usual power source. In order to enable continued operation of the WTG 10 during the grid loss, the WTG controller 20 and various other critical sub-systems are powered at least intermittently by the WTG power system 23. However, in order to minimise standby power usage and preserve the life of the BSS 24, non-critical sub-systems including, for example, the lift system, lighting system, heating system, cooling system, ventilation system, hydraulic pump system and non-critical sensor systems may be automatically de-powered in the standby mode.

As the rotor 11 continues to rotate while the WTG 10 is operating in the standby mode, the WTG 10 may be operated to generate backup power to be supplied to the BSS 24. In the standby mode, the WTG 10 uses the same generator 16 as that used during normal operation of the WTG 10, but the output from the generator 16 is passed to a different power converter that is smaller than the power converter 19 used during normal operation. For example, the power converter 19 used during normal operation may generate approximately 9.5 MW whereas the power converter used in the standby mode may only generate approximately 15 kW. In some cases the BSS 24 may be charged at least substantially continuously, for example by trickle charging, although in other cases the BSS 24 may be charged only when a charging condition is met, for example when the BSS 24 falls below an energy threshold.

When the WTG 10 enters the standby mode, the pitch angle of the blades 12 is no longer controlled using the normal pitch control mode. Instead, the pitch angle of the blades 12 is controlled in accordance with a separate standby pitch control mode, as detailed in steps 5 to 8, in which the pitch angle control module 40 controls the blade pitch based on a modified rotor speed error instead of an actual rotor speed error, as explained in more detail below. In other words, the speed error signal input to the pitch control module is the modified speed error. The standby pitch control mode may consume less power than the normal pitch control mode by reducing the extent to which the blade pitch is varied, such that the power consumption of the WTG is reduced when the WTG is operating in the standby mode.

Under the standby pitch control mode, the speed control module 30 continues to monitor the rotor speed, optionally indirectly by monitoring the generator speed, and generates an indicated rotor speed that indicates the current speed of the rotor 11. In some embodiments the rotor speed may be monitored at a lower frequency when the WTG is operating in the standby mode compared to when the WTG is operating in the normal mode, for example with a monitoring period of 10 seconds.

The indicated rotor speed is then compared to a rotor speed target, as indicated in step 5. The rotor speed target may be a pre-set speed, which may be set, for example, during design, installation or calibration of the WTG 10. Alternatively, the rotor speed target may be variable, and may be calculated during operation of the WTG 10. The rotor speed target is preferably a speed that is well suited to generating backup power during a grid loss. In the present embodiment the rotor speed target is pre-set at 60 rpm, although other values may equally be selected, for example 80 rpm or 100 rpm.

In both the normal and standby pitch control modes, the speed control module 30 determines a rotor speed error by subtracting the rotor speed target from the indicated rotor speed. The rotor speed error is therefore positive if the indicated rotor speed exceeds the rotor speed target, and negative if the indicated rotor speed is less than the rotor speed target.

As noted above, in the normal pitch control mode the pitch angle control module 40 controls the blade pitch based on the rotor speed error.

However, in embodiments of the invention, when the standby pitch control mode is activated, the pitch angle control module 40 controls the blade pitch based on a modified rotor speed error instead of the actual rotor speed error. As indicated in step 6, the modified rotor speed error is generated by applying a control factor, in the form of a gain factor, to the actual rotor speed error. In an embodiment of the invention, the rotor speed error is multiplied by the gain factor to generate the modified speed error.

The value of the gain factor is variable, so that the gain factor can be used to moderate the extent to which the pitch angle control module 40 acts on the actual rotor speed error, for example to damp the response of the pitch angle control module 40 and thereby reduce power consumption when in the standby pitch control mode by setting the modified rotor speed error to a lower value than the actual rotor speed error.

In this embodiment, the value of the gain factor is altered in dependence on the extent of the deviance of the indicated rotor speed from the rotor speed target as described below and as indicated in step 7. In most circumstances, the value of the gain factor will lie between zero and one, although the gain factor can in certain circumstances have a value greater than one. The gain factor typically does not take a negative value, however.

In altering the value of the gain factor, the speed control module 30 operates a closed loop in which the indicated rotor speed is monitored. The value of the gain factor is altered at the end of each iteration of the loop in dependence on the magnitude of the indicated rotor speed.

When the indicated rotor speed lies inside a first range of rotor speeds, the value of the gain factor is decreased at the end of each cycle of the control loop and so the value of the gain factor moves towards zero.

It is noted that once the gain factor reaches zero, the modified rotor speed error also becomes zero. In this situation, the pitch angle control module 40 acts as though the measured rotor speed matches the target rotor speed and so takes no action.

The first range of rotor speeds is a relatively narrow range of rotor speeds that contains within it the rotor speed target. The indicated rotor speed lying within the first range of rotor speeds therefore indicates that the indicated rotor speed only deviates from the rotor speed target by a relatively small amount. In certain embodiments of the invention, for a target rotor speed of 60 rpm the first range of rotor speeds may extend from 55 rpm to 70 rpm, for example. In this case, therefore, the value of the gain factor decreases on each control loop cycle, until it reaches zero, for as long as the indicated rotor speed lies between 55 rpm and 70 rpm.

The decrease to the value of the gain factor may be uniform across the whole of the first range of rotor speeds, i.e. the gain factor may decrease by a first decrement at the end of a control loop cycle if the indicated rotor speed lies anywhere in the first range of rotor speeds. In this case, the gain factor would therefore decrease by the same amount on each control loop cycle when the indicated rotor speed lies anywhere between 55 rpm and 70 rpm.

Alternatively, the gain factor may decrease by a first decrement at the end of a control loop cycle when the indicated rotor speed lies within the first range of rotor speeds and is greater than the rotor speed target, and may decrease by a second decrement at the end of a control loop cycle when the indicated rotor speed lies within the first range of rotor speeds and is less than the rotor speed target. In this case, the gain factor would decrease by a certain amount when the indicated rotor speed lies between 60 rpm and 70 rpm and would decrease by a different amount when the indicated rotor speed lies between 55 rpm and 60 rpm. With these parameters, there is a narrower range of rotor speeds below the rotor speed target and consequently the second decrement may be greater than the first decrement in order to compensate for this.

In other embodiments, the decrease to the gain factor may be related to the extent of the rotor speed error. For example, in these embodiments the decrease to the gain factor may be inversely proportionate to the rotor speed error so that the amount by which the gain factor is decreased may be larger when the rotor speed error is smaller. In other words, when the indicated rotor speed is closer to the rotor speed target, the gain factor is decreased by a greater amount than when the indicated rotor speed is further from the rotor speed target, but still within the first range of rotor speeds.

Conversely, when the indicated rotor speed lies outside the first range of rotor speeds, the value of the gain factor increases at the end of each control loop cycle and so moves the value of the gain factor closer to one. In certain embodiments, the amount by which the gain factor is increased may be the same regardless of how far the indicated rotor speed is outside of the first range of rotor speeds. In other words, the value of the gain factor may be increased by a first increment each time the control loop iterates when the indicated rotor speed lies outside the first range of rotor speeds.

In alternative embodiments, the gain factor increases by a first increment at the end of a control loop cycle when the indicated rotor speed lies outside the first range of rotor speeds and is above the rotor speed target, and increases by a second increment at the end of a control loop cycle when the indicated rotor speed lies outside the first range of rotor speeds and is below the rotor speed target.

In other embodiments, the increase to the gain factor on each control cycle may be in proportion to the rotor speed error when the rotor speed is outside the first range of rotor speeds. In these embodiments, the amount by which the gain factor is increased may be larger when the speed error is larger. In other words, when the indicated rotor speed is further from the rotor speed target, the amount by which the gain factor is increased is larger than when the indicated rotor speed is closer to the rotor speed target, but still outside the first range of rotor speeds.

In further embodiments of the invention, there may exist a second range of rotor speeds, which is wider than and encompasses the first range of rotor speeds. In certain embodiments, the second range of rotor speeds extends from 35 rpm to 120 rpm, for example.

In embodiments of the invention in which a second range of rotor speeds exists, the gain factor is increased in the manner described above only when the indicated rotor speed lies outside of the second range of rotor speeds. In other words, for an embodiment where the second range of rotor speeds extends between 35 rpm and 120 rpm, the value of the gain factor is only increased when the indicated rotor speed is either greater than 120 rpm or less than 35 rpm. As described above, this increase may be by a first decrement regardless of the value of the indicated rotor speed, as long as it falls outside the second range of rotor speeds, or it may be by a first increment when the indicated rotor speed is greater than 120 rpm and by a second increment when the indicated rotor speed is less than 35 rpm. The indicated rotor speed lying outside the second range of rotor speeds therefore indicates that the indicated rotor speed deviates from the rotor speed target by a significant amount.

In certain embodiments, the value of the gain factor may be left unchanged when the indicated rotor speed lies outside of the first range of rotor speeds and inside the second range of rotor speeds. In the embodiments described above, this would correspond to the indicated rotor speed lying between 35 rpm and 55 rpm or between 70 rpm and 120 rpm.

It will be obvious to the skilled person that, although the alterations to the gain factor are presented here as being dependent on the value of the indicated rotor speed, an equivalent outcome may be reached by considering the rotor speed error instead. For example, converting the rotor speed ranges mentioned above to equivalent rotor speed errors, the value of the control factor may decrease when the rotor speed error is between −5 rpm and +10 rpm and may increase when the rotor speed error exceeds +60 rpm or is less than −25 rpm.

From the above description of how the value of the gain factor is altered, it will be apparent that the value of the gain factor is linked to the history of the indicated rotor speed and the rotor speed error. For embodiments in which the value of the gain factor is held between zero and one, a value of the gain factor that is closer to one than to zero indicates that the indicated rotor speed has spent more time outside the second range of rotor speeds than inside the first range of rotors speeds, and therefore the average deviation from the rotor speed target has been relatively high. On the other hand, a value of the gain factor that is closer to zero than to one indicates that the indicated rotor speed has spent more time within the first range of rotor speeds than outside it, and has therefore exhibited a relatively low average deviation from the rotor speed target.

Since the value of the modified speed error depends on the value of the gain factor, the changes to the gain factor as the rotor speed changes affect the value of the modified speed error. If the indicated rotor speed lies outside the second range of rotor speeds for a prolonged period of time, the gain factor and modified speed error will continue to increase, in turn increasing the responsiveness of the pitch angle control module 40 to the rotor speed error. In contrast, if the indicated rotor speed lies within the first range of rotor speeds, the modified speed error will decrease as the gain factor decreases, thereby effectively damping the response of the pitch angle control module 40 to conserve energy.

Since the gain factor lies between zero and one, the modified speed error is smaller than or equal to the rotor speed error. Consequently, the extent to which the pitch angle of the blades 12 is varied is generally reduced when operating in the standby pitch control mode as opposed to the normal pitch control mode.

In certain embodiments of the invention, there may exist a third range of rotor speeds, which is wider than and encompasses both of the first and second ranges of rotor speeds. In certain embodiments of the invention, the third range of rotor speeds may extend from 32 rpm to 123 rpm.

In embodiments of the invention where in which a third range of rotor speeds exists, when the indicated rotor speed lies outside the third range of rotor speeds the rotor speed is considered to be in a critical region and the gain factor may be increased to a critical value immediately. In other words, for an embodiment where the third range of rotor speeds extends from 32 rpm to 123 rpm, the value of the gain factor is increased to a critical value when the indicated rotor speed is greater than 123 rpm or when the indicated rotor speed is less than 32 rpm. The critical value may be greater than one, such that the modified speed error is greater than the actual rotor speed error. This has the effect of making the pitch angle control module 40 more responsive to the error than it would be in the normal mode, allowing the rotor speed error to be eliminated at a faster rate when it is detected that the indicated rotor speed is in the critical region.

While the WTG 10 is operating in the standby mode, the PPC 7 and the WTG controller 20 continue to monitor the availability of the external grid 2. Once the fault has cleared and the external grid 2 is once again available to receive power, the WTG is reconnected to the external grid 2 and returned to the normal mode for supplying power to the external grid 2, as indicated in step 9. Upon the WTG 10 re-entering the normal mode, the pitch angle control module 40 is operated to continuously control the pitch angle of the blades 12 in accordance with the normal pitch control mode.

Other variations and modifications will also be apparent to those skilled in the art. It is especially important to understand that the values quoted above, for example for the limits of the first, second and third rotor speed ranges, are indicative only and will vary greatly in practice in dependence on the properties of the specific system in which they are implemented. Even slightly different systems may have significantly different values for these parameters.

The invention claimed is:

1. A method of operating a wind turbine generator comprising a rotor having a plurality of blades, the method comprising:
   comparing an indicated rotor speed with a rotor speed target to determine a rotor speed error;
   generating a modified rotor speed error by applying a control factor to the rotor speed error;
   controlling a pitch angle of each blade via a pitch control system in accordance with the modified speed error;
   altering the control factor in dependence on a size of the indicated rotor speed; and
   comprising decrementing the control factor when the indicated rotor speed is in a first range of rotor speeds, and wherein decrementing comprises decreasing the control factor by a first decrement when the indicated rotor speed is inside the first range of rotor speeds and is greater than the rotor speed target, and decreasing the control factor by a second decrement when the indicated rotor speed is inside the first range of rotor speeds and is less than the rotor speed target.

2. The method of claim 1, wherein altering the control factor in dependence on a size of the indicated rotor speed comprises decreasing the control factor if the indicated rotor speed is in a first range of rotor speeds that includes the rotor speed target.

3. The method of claim 2, wherein altering the control factor in dependence on a size of the indicated rotor speed comprises increasing a value of the control factor if the indicated rotor speed is outside the first range of rotor speeds.

4. The method of claim 3, further comprising increasing the value of the control factor when the indicated rotor speed is outside a second range of rotor speeds that is wider than and encompasses the first range of rotor speeds, and leaving the control factor unchanged when the indicated rotor speed is outside of the first range of rotor speeds but within the second range of rotor speeds.

5. The method of claim 4, further comprising setting the control factor to a predetermined value when the indicated rotor speed is outside a third range of rotor speeds that is wider than and encompasses the second range of rotor speeds.

6. The method of claim 5, wherein the predetermined value is greater than one.

7. The method of claim 5, comprising incrementing the control factor when the indicated rotor speed is outside the first range of rotor speeds.

8. The method of claim 7, comprising increasing the control factor by a first increment when the indicated rotor speed is outside the first range of rotor speeds and is greater than the rotor speed target, and increasing the control factor by a second increment when the indicated rotor speed is outside the first range of rotor speeds and is less than the rotor speed target.

9. The method of claim 1, wherein the method corresponds to a standby pitch control mode of the wind turbine generator for use when the wind turbine generator is idling, the standby pitch control mode being less responsive than a normal pitch control mode of the wind turbine generator, such that power consumption of the wind turbine generator is reduced when the wind turbine generator is operating in the standby pitch control mode.

10. The method of claim 9, wherein the standby pitch control mode is utilised when the wind turbine generator is idling during a state of grid loss.

11. A control system for a wind turbine generator comprising a rotor having a plurality of blades, the control system being configured to:
compare an indicated rotor speed with a rotor speed target to determine a rotor speed error;
generate a modified rotor speed error by applying a control factor to the rotor speed error;
control a pitch angle of each blade in accordance with the modified speed error;
alter the control factor in dependence on a size of the indicated rotor speed; and
decrement the control factor when the indicated rotor speed is in a first range of rotor speeds, wherein decrementing the control factor comprises decreasing by a first decrement when the indicated rotor speed is inside the first range of rotor speeds and is greater than the rotor speed target, and decreasing the control factor by a second decrement when the indicated rotor speed is inside the first range of rotor speeds and is less than the rotor speed target.

12. A controller, comprising:
a memory containing instructions;
a processor communicatively coupled to the memory and, which when programmed with the instructions, performs an operation of operating a wind turbine generator comprising a rotor having a plurality of blades, the operation comprising:
comparing an indicated rotor speed with a rotor speed target to determine a rotor speed error;
generating a modified rotor speed error by applying a control factor to the rotor speed error;
controlling a pitch angle of each blade via a pitch control system in accordance with the modified speed error;
altering the control factor in dependence on a size of the indicated rotor speed; and
decrementing the control factor when the indicated rotor speed is in a first range of rotor speeds, and wherein decrementing comprises decreasing the control factor by a first decrement when the indicated rotor speed is inside the first range of rotor speeds and is greater than the rotor speed target, and decreasing the control factor by a second decrement when the indicated rotor speed is inside the first range of rotor speeds and is less than the rotor speed target.

13. The controller of claim 12, wherein altering the control factor in dependence on a size of the indicated rotor speed comprises decreasing the control factor if the indicated rotor speed is in a first range of rotor speeds that includes the rotor speed target.

14. The controller of claim 13, wherein altering the control factor in dependence on a size of the indicated rotor speed comprises increasing a value of the control factor if the indicated rotor speed is outside the first range of rotor speeds.

* * * * *